United States Patent [19]

Visseren et al.

[11] 3,839,258

[45] Oct. 1, 1974

[54] PROCESS OF PREPARING A LATEX OF AN ORGANIC POLYMER FROM A SOLUTION OF THIS POLYMER IN AN ORGANIC SOLVENT

[75] Inventors: Marinus J. R. Visseren, Geleen; Renier J. L. Graff, Beek, both of Netherlands

[73] Assignee: Stamicarbon N.V., Heerlen, Netherlands

[22] Filed: Mar. 7, 1972

[21] Appl. No.: 232,613

[30] Foreign Application Priority Data

Mar. 9, 1971  Netherlands...................... 7103087

[52] U.S. Cl................ 260/29.7 EM, 260/29.6 PM, 260/29.7 E, 260/29.7 NE

[51] Int. Cl. ........................... C08d 5/02, C09d 7/00
[58] Field of Search...........260/29.6 PM, 29.7 EM, 260/29.7 PT, 29.7 NE

[56] References Cited
UNITED STATES PATENTS 3,310,515  3/1967  Halper et al. ..................... 260/29.7
3,310,516  3/1967  La Heij et al. ..................... 260/29.7

FOREIGN PATENTS OR APPLICATIONS 1,016,235  2/1964  Great Britain

*Primary Examiner*—Allan Lieberman
*Assistant Examiner*—T. De Benedictis, Sr.
*Attorney, Agent, or Firm*—Cushman, Darby & Cushman

[57] ABSTRACT

An improvement in the process of preparing a latex of an organic polymer from an organic solvent solution of this polymer involving the steps of emulsifying the polymer solution with water, evaporating the organic solvent in the emulsion so as to substantially foam the emulsion components, liquifying the organic solvent vapor causing the foam to sag and the formation of an organic solvent phase and an aqueous phase containing the polymer, and finally separating and recovering the polymer containing aqueous phase from the organic phase, the improvement being introducing the polymer in an organic solvent having a water solubility of less than 0.5 cc per liter, measured at 20°C and carrying out the solvent evaporation step in the presence of at least one organic oxygen compound containing more than one carbon atom.

15 Claims, No Drawings

PROCESS OF PREPARING A LATEX OF AN ORGANIC POLYMER FROM A SOLUTION OF THIS POLYMER IN AN ORGANIC SOLVENT

The invention relates to a process for preparing a latex of an organic polymer from a solution of this polymer in an organic solvent.

It is known from U.S. Pat. No. 3,249,566, that it is possible to prepare a latex from such an organic polymer solution by the steps of (a) emulsifying the polymer solution with water in the presence of one or more emulsifiers; (b) evaporating the organic solvent contained in the emulsion thereby foaming substantially the entire quantity of the emulsion components; (c) liquifying the evaporated organic solvent causing the foam to sag; and (d) separating the sagged foam into an aqueous phase containing the emulsifier and the polymer, and an organic solvent phase, and subsequently recovering the aqueous polymer containing phase. However, the process as described in this patent has only a very limited practical application in that the type of organic solvent which may be used in the process is critically limited.

According to this patent, only those organic solvents having a solubility in water of at least 0.5 cc per liter, measured at 20°C, and up to 5 cc per liter, and preferably, only solvents having a water solubility in the range between 0.6 and 2 cc per liter of water, may be used. Additionally, the solvents suitable for use according to this prior process should preferably have a boiling point at least 65°C below the boiling point of water under the same conditions and pressure.

It has been found that if this prior process is carried out using an organic solvent having a water solubility lower than 0.5 cc per liter, the aqueous phase obtained from the phase separation still contains a very large proportion of the organic solvent, generally over 50 percent by volume based on the original polymer solution. This remaining solvent cannot be separated from the aqueous phase by repetition of the process, nor can it be separated by any other known evaporation technique. This known process has therefore proved to be unsuitable for the processing of organic polymer solutions in solvents having a water solubility lower than 0.5 cc per liter.

Many organic polymers, however, and in particular many rubbery polymers such as homopolymers of conjugated dienes including butadiene and isoprene, copolymers of these dienes with monovinyl aromatic compounds including copolymers of butadiene and styrene, copolymers of ethylene and at least one other $\alpha$-alkene, and possibly one or more alkadienes, are mostly prepared in organic solvents having a water solubility at 20°C lower, and often considerably lower, than 0.5 cc per liter.

Polymer solutions obtained by polymerization in solvents of this type cannot be directly treated under this above process in order to prepare latices. The polymer must first be separated from the solvent and subsequently dissolved in a solvent which may be employed in this process, e.g., a solvent having a water solubility at 20°C of at least 0.5 cc per liter. Such a process is extremely involved and expensive, and as a result will not be employed in practical application.

It is also known, in the preparation of dispersions of macromolecular substances in water by emulsifying solutions of one or more macromolecular substances in organic solvents which are not water-miscible or water-miscible only to a limited degree, that it is possible to supress troublesome foam formation, which occurs in the removal of the organic solvent from the resulting dispersion, for instance by evaporation, and the attendant partial coagulation and sliming, by the addition of one or more organic oxygen compounds before the removal of the solvent. Furthermore, the addition of these organic oxygen compounds is also known to control the particle size of the resulting latex within certain limits.

The object of the present invention is to provide a process for preparing latices suitable for the processing of polymer solutions in organic solvents having a water solubility at 20°C of less than 0.5 cc per liter.

It is a further object of this invention to provide a process by which excellent latices can be prepared in a simple and economical manner from polymer solutions obtained by polymerization in solvents having a water solubility at 20°C of less than 0.5 cc per liter. According to the invention, it is has now been found that organic solvents having a water solubility at 20°C of less than 0.5 cc per liter can be satisfactorily removed from the latex product by:

a. emulsifying the organic solvent polymer solution with water in the presence of one or more emulsifiers;

b. evaporating the organic solvent contained in the emulsion, in the presence of one or more organic oxygen compounds which do not have an acid reaction under the conditions under which the organic solvent is evaporated, and which organic oxygen compounds contain one or more carbon atoms, thereby foaming substantially the entire quantity of the emulsion components;

c. liquifying the evaporated organic solvent causing the foam to sag; and d. separating the sagged foam into an aqueous phase containing the emulsifier and the polymer, and an organic solvent phase, and subsequently recovering the aqueous polymer containing phase.

Surprisingly, it has been found that the addition of the organic oxygen compounds, which heretofore had been used in the preparation of latices only to surpress foaming and sliming and to control the particle size, would also significantly raise the efficiency of solvent removal by the above method to such an extent that this method can be carried out with organic solvents which, in the absence of such organic oxygen compounds, would be entirely unsuitable for this method.

In the process according to the invention use can be made of any organic polymer dissolved in a solvent whose water-solubility at 20°C is lower than 0.5 cc per liter. The way in which such a polymer solution has been obtained is of no consequence. Use can be made of a polymer solution obtained by solution polymerization in a solvent whose water solubility is lower than 0.5 cc per liter, as well as of a polymer solution obtained by transferring a dispersed polymer into such a solvent or by dissolving a solid polymer in a solvent having a water solubility of less than 0.5 cc per liter. However, the advantages of this invention are most fully realized in the processing of polymer solutions obtained by solution polymerization directly in such an organic solvent.

Examples of polymers that can be prepared by solution polymerization in a solvent having a water-solubility lower than 0.5 cc per liter include polymers of conjugated dienes, such as butadiene and isoprene, copolymers of such dienes, such as copolymers of butadiene and styrene and of butadiene and acrylonitrile, in which either the diene or the copolymerized compound may be predominant, and polymers of one or more ethylenically unsaturated monomers. Very good results are also obtained using a copolymer of ethylene, at least one other α-alkene, and possibly one or more poly-unsaturated compounds, such as dienes. Examples of poly-unsaturated compounds that can be applied as comonomers in the copolymerization of two or more monoalkenes include, dicyclopentadiene, 5-ethylidene norbornene-2, 5-methylidene norbornene-2, cyclooctadiene, hexadiene-1,4, and 5-vinyl norbornene-2.

Suitable organic solvents may be selected from any of a large number of compounds. As a rule, hydrocarbons in general are extremely suitable. The invention has particular application to those compounds which have a water-solubility lower than 0.5 cc per liter, and more particularly to organic solvents having a water solubility lower than 0.3 cc per liter, measured at 20°C. Examples of such solvents include hexane, heptane, pentane, octane and cyclohexane. Preferably, use is made of polymer solutions in cracking fractions, for instance, technical grade gasoline, since polymerization reactions are frequently carried out in such fractions.

The polymer solutions may vary widely in solid matter content. However, as a rule polymer solutions containing 10 to 300 grams, and more preferably 10 to 100 grams of solid matter per one liter of organic solvent are used.

The organic oxygen compounds applied may be those compounds which contain more than one carbon atom and do not show an acid reaction under conditions under which the organic solvent is evaporated. Organic oxygen compounds showing an acid reaction under the conditions under which the organic solvent is evaporated, for instance phenols and esters, which hydrolyze during the evaporation, cannot be used in the process according to the invention, since they cause the polymer to coagulate.

The oxygen containing compounds to be applied according to the invention include especially alcohols, ketones and esters having two to ten and preferably two to eight carbon atoms per molecule.

Suitable organic oxygen compounds may be either readily or poorly soluble in water. Readily soluble organic oxygen compounds for purposes of this invention are those compounds which, at the pressure and tempeature applied in the emulsification, have a water-solubility higher than 20 g per 100 ml of water. Poorly soluble organic oxygen compounds for purposes of this invention are those compounds which, under these conditions, have a water-solubility of less than 20 g per 100 ml.

Examples of readily water-soluble oxygen compounds suitable for use in the process of this invention include ethanol, propanol, isopropanol, tertiary butanol, allyl alcohol, acetone, methyl ethyl ketone, cyclohexanol, and cyclohexanone. Examples of suitable poorly water-soluble organic oxygen compounds include butanol-1, isobutanol, secondary butanol, the various amyl alcohols, methyl isobutyl carbinol, the hexanols, the heptanols and octanols, methyl isobutyl ketone, diethyl ketone, methyl-n-butyl ketone, isophorone, mesityl oxide, n-propyl acetate, isopropyl acetate, n-butyl acetate, and n-amyl acetate.

Preferably, however, organic oxygen compounds readily soluble in water, and more preferably, alcohols with two to eight carbon atoms, are employed. Readily soluble alcohols are particularly suitable as these compounds give the best separation efficiencies. Extremely good results were obtained using isopropanol as the organic oxygen compound.

The organic oxygen compounds to be applied according to the invention should be present during the evaporation of the organic solvent. They may be added during any of the preceding stages of the latex preparation, such as before, during or after the emulsification. It is also possible to add part of the organic oxygen compound before and part after the emulsification.

Under certain conditions it may be advantageous to use a mixture of organic oxygen compounds, for instance a mixture of a readily-soluble and a poorly-soluble oxygen compound. It can also be advantageous to add two different oxygen compounds at two different stages of the process.

By preference, part of the organic oxygen compound or compounds is added to the water, and part to the polymer solution, after which the polymer solution and the water are mixed.

The organic oxygen compounds preferably should have a boiling point below 100°C, and more preferably between 40 and 90°C. Additionally, organic oxygen compounds which, in combination with water, form a minimum boiling azeotrope having a boiling point lower than 100°C, and more preferably between 40 and 90°C, are suitable for use in this process.

The amount of organic oxygen compound to be added is not critical and may vary widely within the range of from about 1–70 percent by weight based on the amount of water used to form the emulsion, but will preferably be between about 5 and 50percent by weight.

The emulsification step is carried out by contacting the polymer solution with water in the presence of one or more emulsifiers. The contacting of the polymer solution, water and emulsifier may be accomplished by means of any suitable emulsifying device, such as a device of the Ultra-Turrax type.

Suitable emulsifiers for this process step may be anionic, cationic, or non-ionic, and it may be advantageous to apply two different emulsifiers, for instance, selected from these different classes of emulsifiers.

Examples of anionic emulsifiers which may be used include sodium or potassium salts of higher fatty acids and resin acids such as oleic acid, palmitic acid, stearic acid, lauric acid, myristic acid, arachic acid, ricinic acid and other similar acids.

Examples of cationic emulsifiers which may be used include amine salts such as the hydroxylamines of fatty acid esters, quaternary ammonium salts such as tridecyl benzene hydroxyl ethyl imidazole chloride and stearyl dimethyl benzyl ammonium chloride.

Examples of non-ionic emulsifiers which may be used include the phosphoric acid esters of higher alcohols such as capryl alcohol and octyl alcohol, monoesters of oleic acid and pentaerythritol sorbitol mono-oleate, and similar compounds.

The amount of emulsifier to be added depends on a variety of conditions, including the nature and the concentration of the polymer solution employed. In most cases, the addition of emulsifier in amounts of between about 1 and 40 parts per 100 parts of polymer are suitable for this process but amounts generally between about 5 and 15 parts per 100 parts of polymer are preferred.

The amount of water needed in forming the emulsion is generally between about 40 and 300 parts per 100 parts of the polymer solution, but water in an amount of between about 50 and 100 parts per 100 parts of polymer solution is preferred. However, the addition of larger quantities of water is permissible.

The temperature at which the emulsification is effected has a very strong influence on the particle size of the latex ultimately prepared. If the emulsification takes places at too high a temperature, the ultimate latex will contain a larger proportion of coarse polymer particles, which will render the latex unstable. For the preparation of a latex having an optimum particle size, the temperature should generally be maintained between about 0° and 60°C.

After the emulsification step, the emulsion can, if so desired, be subjected to a creaming treatment. By "creaming treatment" is meant a treatment by which the larger emulsion particles within the emulsion are caused to concentrate in the top layer and separate from the body of the emulsion. These concentrated coarse emulsion particles can then easily be removed from the body of the emulsion and, if desired, be recycled. This creaming treatment may be carried out in a simple device, such as a tank. The time needed to effect an adequate separation of the coarsest emulsion particles from the body of the emulsion depends on the effectiveness of the emulsifying step, the specific gravity of the organic solvent, and the viscosity of the emulsion. Usually, the retention time in such a creaming treatment is between about 30 and 3000 minutes, preferably between about 30 and 1000 minutes. The cream, that is the phase formed by the coarser emulsion particles, can be removed either continuously or batch wise, but preference is given to a continuous removal of the cream from the top portion of the emulsion. The cream thus separated out can, if desired, be recycled to the emulsification step.

The emulsion prepared as above, either with or without the optional step of creaming, is then foamed by evaporation of the organic solvent.

Evaporation of the organic solvent can be effected either by heating the emulsion, or by heating and subjecting the emulsion to reduced pressure. In either treatment, a considerable portion of the organic solvent is evaporated, with the result that a foamy product is formed from substantially the entire quantity of the emulsion components.

This foaming step may be carried out in many types of standard heating devices, but most conveniently, a heat exchanger equipped with tubes is used. The emulsion may pass through the heat exchanger either inside or outside the tubes.

The time required for carrying out this foaming step depends on a number of factors including the nature of the organic solvent applied, the viscosity of the emulsion, the temperature at which the foaming treatment is carried out, and other factors, and therefore cannot be prescribed by exact limits. However, the optimum foaming time under a given set of conditions may be easily determined and the exact foaming time is not critical to this process.

Under certain conditions, it is possible that this foaming treatment may not remove all of the organic solvent from the polymer, in which case some of the collodial polymer particles will be strongly swollen and form a slimy product. This slime, if formed, may be removed by an after treatment as described below. However, the amount of slime formed has been found to be strongly dependent on the type of organic oxygen compound present during the foaming or evaporation step. If for example isopropanol is used as the organic oxygen compound, no noticeable slime formation occurs, and an after-treatment for slime removal may be omitted.

After the formation of the foam from substantially the entire mass of emulsion, the next step of this process according to the invention involves the liquification of the evaporated organic solvent.

The liquification of the evaporated organic solvent can most easily be effected by raising the pressure in the system to such a value that the vapor of the solvent condenses, or by cooling the foamy product to a sufficiently low temperature. Naturally, a combination of these two treatments may also be applied. The necessary amount of cooling or rise in pressure is of course dependent upon the particular solvent used, and may be easily determined. It is evident, however, that the cooling preferably should not be continued to the point where the aqueous phase becomes solid.

The liquification of the evaporated organic solvent should be carried out with as little turbulence as possible, so as to prevent, or at any rate limit as much as possible, the organic solvent being taken up again in the polymer. The sagging of the foamy product caused by this liquification results in the formation of a mixture of two phases which are substantially immiscible. The one phase consists of the organic solvent, the other consists of the aqueous latex, and contains the emulsifier and the polymer. This two phase mixture can then be passed to a settling vessel or a decanting device, where phase separation takes place.

Some slime formation may occur in the separatory device as a result of insufficient separation between the two phases. This may cause processing difficulties requiring removal of the slime. Sliming may be suppressed by passing the mixture, before and/or after the phase separation, through a coalescer. This device may be a coalescer of the electric type, or a packed coalescer. Suitable packing materials for the latter type of coalescer include steel wool, steel packing, glass wool, or, for instance, gauze. The electric charge of an electric coalescer when used for slime removal is usually chosen between 10,000 and 100,000 volts, and preferably between 30,000 and 60,000 volts.

The latex recovered after removal of the solvent phase generally may still contain a small amount of organic solvent. When the process is carried out according to the invention, this small amount of remaining organic solvent can be removed from the latex phase in a simple manner, for instance, by means of a circulation evaporator or a film evaporator. During this final evaporation of organic solvent, almost all of the organic oxygen compound still left in the latex is also removed, and the latex can also be concentrated to a certain extent by the evaporation of water.

It is not necessary that the last traces of the organic solvent and the organic oxygen compound be completely removed from the latex. The presence of a small quantity of these compounds in the final latex product can be tolerated for certain application and indeed, the presence of such compounds in the latex will in some cases be beneficial.

The latex product can, if desired, be concentrated to a higher solid-matter content by centrifuging or by the addition of chemical thickening agents such as hydroxy-ethyl cellulose, carboxymethyl cellulose, alginates, polyvinyl alcohol, polyacrylic acid, and polyammonium acrylate. The serum layer formed during this concentration, that is the water layer having a low concentration of dispersed polymer, can be recycled.

The following examples serve to elucidate the invention without restricting it in any way.

Comparative Example 1

An unsaturated ethylene-propylene copolymer known by the tradename of "KELTAN 520" was dissolved in a gasoline fraction having a boiling range of 65° to 82°C to form a solution having a solid matter content of 50 grams per liter. The water-solubility of the gasoline employed, measured at 20°C, was less than 0.07 cc per liter.

One liter of this polymer solution was added, with intensive stirring by means of an Ultra Turrax type stirrer (10,000 rpm), to 0.5 liter of water containing 5 percent by weight, based on copolymer, of an emulsifier known by the tradename of Antarox CO 710. After all of the solution had been added to the water, stirring was continued for an additional 5 minutes, with external cooling by means of water. As a consequence, the temperature of the emulsion did not rise above 40°C.

After this treatment, the emulsion so formed was introduced into a heat exchanger having a wall temperature of 80°C. The heat exchanger had a length of 1 meter and a diameter of 4 cm. The rate at which the emulsion was supplied to the heat exchanger was 3 liters per hour. As a result of the evaporation of the gasoline, a foamy product was formed in this heat exchanger from substantially the entire amount of the emulsion components. The foamy product formed was next passed to a second heat exchanger, cooled externally with water at 12°C. Here, the gasoline which evaporated in the first heat exchanger condensed, as a result of which the foamy product sagged. The product thus obtained was subsequently passed to a decanter where two phases were formed; a lower aqueous layer of the diluted latex containing the polymer and in which some of the gasoline remained, and an upper layer, consisting mainly of gasoline. In addition, an intermediate layer was formed consisting of a viscous slimy product.

After the aqueous layer had been drained off, a determination was made of the amount of gasoline removed from the emulsion by application of this process. A further determination was made of the volume of slime formed in the process.

The results obtained were as follows:

Removed gasoline: 25% by volume of original polymer solution used.
Slime: 16% by volume of original polymer solution used.

In order to remove an additional quantity of gasoline from the latex formed, the aqueous latex was again subjected to the foaming treatment by returning it into the first heat exchanger. The amount of gasoline removed after this second treatment was 10 percent by volume, and the slime formation amounted to 8 percent volume based on the original volume of polymer solution.

Also a third foaming treatment proved to effect removal of only a small additional quantity of gasoline, only 5 percent volume. From the latex obtained after this third treatment an attempt was made to remove a further amount of gasoline by passing it into a circulation evaporator. Strong foaming resulted, on account of which separation of the resulting gasoline vapor from the aqueous latex was impossible.

This series of experiments showed that the method applied to remove the gasoline from the aqueous latex is completely unsuitable for practical application. It appeared impossible to remove a sufficient quantity of gasoline from the latex to render this suitable for practical use.

Comparative Example 2

The process described in Comparative Example 1 was repeated except this time using 5 percent by weight based on copolymer of sodium oleate and 5 percent by weight based on copolymer, of an emulsifier known by the tradename of TVM 072. After the foaming treatment only 32 percent by volume of gasoline was separated out and, in addition, 12 percent by volume of slime was formed.

It proved impossible after repetition of the foaming treatment to prepare from the latex thus obtained, a latex having a sufficiently lower volatile content. Neither did a treatment in a film evaporator have sufficient effect.

Comparative Example 3

The process of Comparative Example 2 was repeated except using one liter of water per liter of polymer solution to form the emulsion. An amount of 25 percent by volume of gasoline, calculated to the polymer solution, was separated out, and 37 percent by volume of slime was formed.

Example 1

A latex was prepared by the process described in Comparative Example 1. The emulsifier used consisted of a combination of 5 percent by volume, based on copolymer, of sodium oleate and 5 percent by volume of an emulsifier known by the tradename TVM 072. However, in accordance with the invention, the evaporation of the gasoline was now carried out in the presence of an organic oxygen compound, namely, isopropanol.

The quantity of isopropanol added was 20 percent by volume based on the amount of water used. Half of this quantity of isopropanol was added to the water used for emulsifying the polymer solution and the other half of the isopropanol was added directly to the polymer solution. Next, the polymer solution and water were mixed with each other, foamed and sagged as in Comparative Example 1, and 92 percent volume of the amount of gasoline originally present in the emulsion could be separated out in the decanting device. Also, a very small amount of slime was formed, about 0.1 percent volume with respect to the amount of polymer solution used.

The resulting dilute latex was subsequently separated from the gasoline, organic solvent and slime layer and was fed into a circulation evaporator having a heating jacket temperature of 100°C. The latex eventually obtained had a solid matter content of about 10 percent wt. and contained less than 0.05 percent wt. of volatile components.

Subsequently, 1.5 grams of hydroxy-ethyl cellulose, known by the tradename of Cellozise QP 52000, were added per liter of dilute latex. After creaming for 48 hours, a latex having a solid matter content of 53 percent wt. was produced. Analysis showed 90 percent of the particles contained in the latex to have a diameter smaller than 0.5 μ.

Example 2

The process of Example 1 was repeated, this time using 15 percent by volume of isopropanol based on the amount of water used. After the foaming treatment, 86 percent by volume of gasoline, based on the amount of polymer solution, was separated out. An amount of 1.5 percent volume of slime was formed.

The dilute latex obtained in this way was subsequently fed into a circulation evaporator. The dilute latex now obtained contained less than 0.05 percent wt. of volatile components.

Example 3

The process of Example 1 was repeated, this time using 10 percent by volume of isopropanol based on the amount of water used. An amount of 70 percent by volume of gasoline base on the polymer solution, was separated out. Slime formation amounted to 6.5 percent volume. It proved possible to prepare from the resulting dilute latex containing less than 0,05 percent by weight of volatile components.

Example 4

The process of Example 1 was repeated, this time using of 1 liter of water per liter of polymer solution. The whole quantity of isopropanol (20 percent by volume based on the water) was added to the water, after which the water and polymer solution were mixed with each other.

An amount of 74 percent by volume of gasoline, based on the polymer solution, was separated out, and 14 percent by volume of slime, based on the polymer solution, was formed.

Example 5

The process of Example 4 was repeated, this time adding the entire quantity of isopropanol to the polymer solution, after which the polymer solution and the water were mixed with each other. 70 percent by volume of gasoline, based on the polymer solution, was separated out, and 20 percent by volume of slime, based on the polymer solution, was formed.

Example 6

The process of Example 4 was repeated, but this time half of the isopropanol was added to the water, and half to the polymer solution. Next, the water and the polymer solution were mixed. 77 percent by volume of gasoline, based on the polymer solution, was separated out, and 12 percent by volume of slime, calculated to the polymer solution, was formed.

Examples 4, 5 and 6 show that better results are achieved if the orgnaic oxygen compound is distributed between the polymer solution and water than if the organic oxygen compound is added to either the polymer solution or the water alone.

Comparison of Examples 1 and 6 shows that better results are obtained if 0,5 liter of water is used per liter of solution than if 1 liter of water is applied per liter of polymer solution.

Example 7

The process of Example 6 was repeated, but this time 1 liter of water was used per liter of solution, and the organic oxygen compound employed was n-butanol. When 10 percent by volume of n-butanol, based on the amount of water used, was added, 70 percent by volume of gasoline was separated out and 10 percent by volume of slime was formed.

When 15 percent by volume of n-butanol was added, 79 percent by volume of gasoline was separated out and 3 percent by volume of slime was formed.

The dilute latexes obtained in this way proved suitable for the preparation, by means of a film evaporator or a circulation evporator, of a latex containing less than 0.05 percent wt. of volatile components.

Example 8

The process of Example 1 was repeated, with the use of tertirary butanol as the organic oxygen component, in an amount of 15 percent by volume based on the amount of water used. 55 percent by volume of gasoline was separated out, and 35 percent by volume of slime was formed. When 18 percent by volume of tertiary butanol was employed, 71 percent by volume of gasoline was separated out, and 13 percent by volume of slime was formed. The resulting dilute latex was suitable for the preparation of a latex having a low concentration of volatile components.

Example 9

The process of Example 8 was repeated, but this time the organic oxygen compound used was methyl isobutyl ketone. The quantity of methyl isobutyl ketone applied amounted to 20 percent by volume based on the amount of water used. An amount of 57 percent by volume of gasoline based on the polymer solution, was separated out, and 6.5 percent by volume of slime was formed.

What is claimed is:

1. In a process for the preparation of a latex of an organic polymer from a solution of said polymer in an organic solvent, said process comprising the steps of;
    emulsifying the polymer solution with water in the presence of at least one emulsifier to produce an emulsion;
    evaporating said organic solvent contained within said emulsion so as to substantially foam the emulsion components;
    liquifying the evaporated organic solvent causing the foam to sag and the formation of an organic solvent phase and an aqueous phase containing said polymer; and
    separating and recovering said polymer containing aqueous phase from said organic phase,
the improvement consisting essentially in using, as said organic solvent, an organic solvent having a water solubility of less than 0.5 cc per liter measured at 20°C, and carrying out said organic solvent evaporation step in the presence of at least one organic oxygen compound containing more than one carbon atom, which organic oxygen compound does not have an acid reaction under the conditions under which said organic solvent is evaporated, said organic oxygen compound having a boiling point, or forming a minimum azeotrope in combination with water having a boiling point, of less than 100°C.

2. The process of claim 1 wherein said boiling point is within the range from about 40° to about 90°C.

3. The process of claim 1 wherein said at least one oxygen compound is added in an amount of between about 1 and 70 percent by weight based on the amount of water used to form said emulsion.

4. The process of claim 3 wherein said at least one organic oxygen compound is added in an amount of between about 5 to 50 percent by weight based on the amount of water used to form said emulsion.

5. The process of claim 1 wherein said at least one oxygen compound is an alcohol, ester or ketone having two to ten carbon atoms per molecule.

6. The process of claim 1 wherein said at least one organic oxygen compound is an alcohol having two to eight carbon atoms.

7. The process of claim 1 wherein said at least one organic oxygen compound is an alcohol readily soluble in water.

8. The process according to claim 6, wherein said at least one organic oxygen compound is isopropanol.

9. The process of claim 1 wherein at least a portion of said at least one organic oxygen compound is added to the polymer solution, the remainder being added to the water used to form said emulsion, after which said water and polymer solution are mixed.

10. The process of claim 1 wherein said organic solvent is a hydrocarbon cracking fraction having a water solubility of less than 0.5 cc per liter, measured at 20°C.

11. The process of claim 1 wherein said organic solvent is gasoline.

12. The process of claim 1 wherein said polymer is a copolymer selected from the group consisting of ethylene and at least one other $\alpha$-alkene, or ethylene, at least one other $\alpha$-alkene, and at least one poly-unsaturated compound.

13. The process of claim 11 wherein said polymer is a copolymer of ethylene, propylene, and at least dicyclopentadiene as said at least one poly-unsaturated compound.

14. The process of claim 11 wherein said polymer is a copolymer of ethylene, propylene and at least 5-ethylidene norbornene-2 as said at least one poly-unsaturated compound.

15. The process of claim 1 wherein said polymer solution is obtained by the polymerization of at least one ethylenically unsaturated compound in an organic solvent having a water-solubility of less than 0.5 cc per liter, measured at 20°C.

* * * * *